S. W. EMERY & E. P. DOYEN.
Improvement in Safety Shoe for Railway Cars.
No. 124,560.   *Fig. 1.*   Patented March 12, 1872.
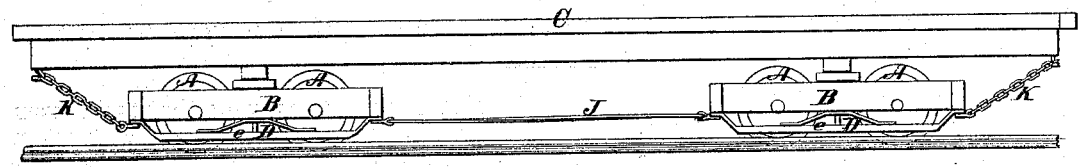
*Fig. 2.*
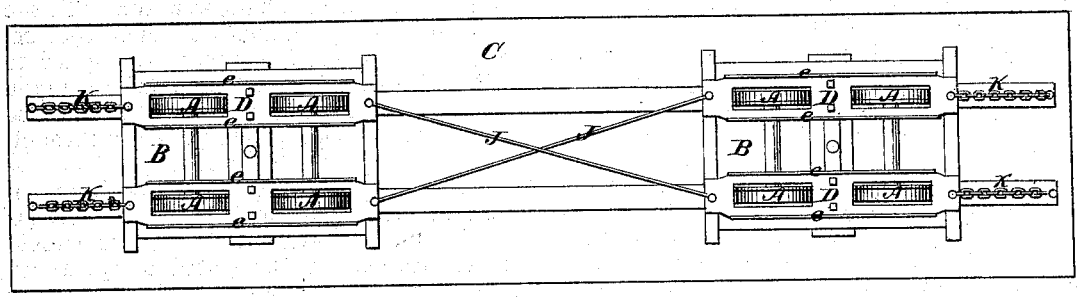
*Fig. 3.*
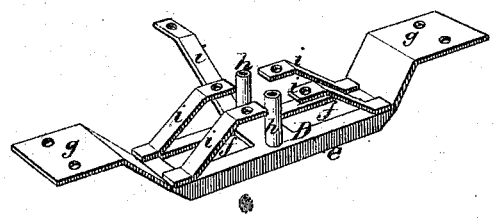
Witnesses.
C. F. Brown
Ir. K. Ellsworth.
Inventors.
Samuel W. Emery
Erasmus P. Doyen.
By Hill & Ellsworth
Their Attorneys.

UNITED STATES PATENT OFFICE.

SAMUEL W. EMERY AND ERASMUS P. DOYEN, OF PORTLAND, MAINE.

IMPROVEMENT IN SAFETY-SHOES FOR RAILWAY CARS.

Specification forming part of Letters Patent No. 124,560, dated March 12, 1872; antedated March 8, 1872.

*To all whom it may concern:*

Be it known that, SAMUEL W. EMERY and ERASMUS P. DOYEN, of Portland, in the county of Cumberland and State of Maine, have invented a new and Improved Safety-Shoe for Railway Cars; and we do hereby declare that the following is a full, clear, and exact description of the construction and operation of the same, reference being had to the annexed drawing making a part of this specification, and to the letters and figures of reference marked thereon.

Figure 1 is a side elevation of a platform-car, showing the application of my improved shoe. Fig. 2 is an inverted plan view of the same, and Fig. 3 is a perspective view of a safety-shoe detached from a car-truck.

Similar letters of reference in the accompanying drawing denote the same parts.

Our invention has for its object to provide means for preventing railroad cars from being thrown off the track by misplaced switches, by the removal of a rail, by broken rails, or by the spreading of the rails; and also to provide a brake by which the motion of the cars is retarded or stopped when from any cause the wheels slip off the rails. It has further for its object to hold the wheels in place, and prevent their escape from the track in the event of an axle becoming broken.

To the accomplishment of these results our invention consists, primarily, in the application to the under surface of a car-truck of two parallel safety-shoes, through which the wheels of the truck project to bear upon the rails. Each shoe is made of much greater width than the thickness of the wheels, and is formed with a downward-projecting flange upon each edge, the distance between such flanges and the sides of the wheels being equal, or a little more than equal, to the width of a rail. By this construction, when the wheels slip off the track from any cause the shoes drop down upon the rails to support the cars, and are held thereon by the flanges. The friction of the shoes upon the rails, owing to the large bearing-surface of the former, acts as a powerful brake to retard and stop the motion of the cars without the application of the train-brakes. The trucks of each car are connected together by crossed rods, and their outer ends are secured to the platform or frame by means of chains or rods, to prevent the trucks from turning transversely beneath the cars when the wheels slip off the track, but at the same time permitting the necessary lateral movement of the trucks in passing curves or irregularities in the rails.

In the accompanying drawing, A A are the wheels, and B the trucks attached to a platform or car, C, in the usual manner. D are the safety-shoes, constructed as shown, with the parallel side flanges $e$, and with the slots or openings $f$ in line with each other between the flanges. Two shoes are applied to the under side of each truck, and arranged parallel to each other beneath the axles, so that the wheels shall project slightly through the openings $f$, as shown in Figs. 1 and 2. The shoes are beveled or turned up in an inclined direction at the ends of the flanges, for a twofold purpose—to wit: First, to enable the flat portions $g$ to be bolted to the under surface of the truck, and at the same time carry the main body near the rails. Secondly, to present an inclined surface to the rails at the ends of the flanges, instead of a shoulder, so that in the event of a rail being broken or removed the shoes shall slide easily upon the ties or sleepers and mount the adjoining rail. The body of each shoe is supported at its center by means of bolts which pass through the tubes $h$ and through the side pieces of the truck. The bolts lock the tubes firmly between the shoes and the truck, while the ends of the tubes form shoulders to prevent the shoes from being forced upward, either upon or with the bolts. The shoes are further secured to the truck by means of the brace bars or rods $i$, as shown in Fig. 3. We do not desire, however, to limit ourselves to any specific means for securing the shoes to the trucks, as they may be applied in various ways, according to the construction of the truck, the essential requisite being that they shall be firmly secured. The shoes may be either composed of metal and wood, or wholly of metal, if desired. J are crossed rods pivoted or swiveled to the proximate ends of the trucks, and K are chains by which the outer ends of the latter are connected to the body of the car.

The operation is as follows: If the wheels slip off the track from any cause while the cars are in motion, the shoes drop down upon the rails and bear thereon between one of the flanges of each shoe and the wheels. In this manner the cars are supported and held upon the rails until stopped by the friction of the shoes upon the latter. If a rail should be removed from the track, the shoes ride freely over the ties or sleepers, and mount the adjoining or standing rails without throwing the cars from the track.

Our invention is of special value in the event of the rails spreading, or when a misplaced switch is encountered, because in either case the shoes afford a secure and accurate guide to conduct the cars upon the standing rails.

The wide surface of the shoes necessary to receive a rail between the flanges upon each side the wheels also forms a support for the cars, to prevent their being tipped over sidewise when obstructions are encountered.

The breaking of an axle or wheel cannot throw the cars from the track, because the shoe at that point where the breakage occurs drops readily upon the rail, and also prevents the axle or broken wheel from escaping beneath the shoe.

Having thus described our invention, what we claim as new is—

1. The safety-shoe constructed as described, with the parallel side flanges, the opening for the wheels, and the beveled or inclined ends in front and rear of the wheels, for the purposes specified.

2. In combination with the safey-shoes, we claim the guide rods J and chains K, substantially as described, for the purposes specified.

In testimony that we claim the above we have hereunto subscribed our names in the presence of two witnesses.

SAML. W. EMERY.
ERASMUS P. DOYEN.

Witnesses:
WARREN ROBINSON,
G. C. PETERS.